(12) United States Patent
Iwasaki et al.

(10) Patent No.: US 9,625,012 B2
(45) Date of Patent: Apr. 18, 2017

(54) AUTOMATIC TRANSMISSION (71) Applicant: MAZDA MOTOR CORPORATION, Hiroshima (JP)

(72) Inventors: Tatsuhiko Iwasaki, Hiroshima (JP); Shinya Kamada, Kure (JP); Yasuhiro Ogauchi, Higashi-hiroshima (JP); Masaru Nakagishi, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/033,523

(22) PCT Filed: Nov. 5, 2014

(86) PCT No.: PCT/JP2014/005575
§ 371 (c)(1),
(2) Date: Apr. 29, 2016

(87) PCT Pub. No.: WO2015/072113
PCT Pub. Date: May 21, 2015

(65) Prior Publication Data
US 2016/0281824 A1 Sep. 29, 2016

(30) Foreign Application Priority Data

Nov. 18, 2013 (JP) ................................. 2013-238183

(51) Int. Cl.
*F16H 3/66* (2006.01)
(52) U.S. Cl.
CPC ....... *F16H 3/666* (2013.01); *F16H 2200/003* (2013.01); *F16H 2200/006* (2013.01); *F16H 2200/2012* (2013.01); *F16H 2200/2043* (2013.01)

(58) Field of Classification Search
CPC ............... F16H 3/666; F16H 2200/006; F16H 2200/2043; F16H 2200/2012
USPC .......................................... 475/275–291, 330
See application file for complete search history.

(56) References Cited

U.S. PATENT DOCUMENTS

| 7,824,300 | B2 | 11/2010 | Wittkopp et al. | |
| 9,033,846 | B2 * | 5/2015 | Beck | F16H 3/666 |
| | | | | 475/275 |
| 2008/0108474 | A1 * | 5/2008 | Seo | F16H 3/663 |
| | | | | 475/284 |
| 2008/0242488 | A1 | 10/2008 | Phillips et al. | |
| 2008/0300095 | A1 | 12/2008 | Doi et al. | |

(Continued)

FOREIGN PATENT DOCUMENTS

| DE | 10 2009 047 265 A1 | 6/2011 |
| IE | 10 2008 051 177 A1 | 8/2009 |

(Continued)

OTHER PUBLICATIONS

International Search Report and Written Opinion issued in Application No. PCT/JP2014/005575, mailed Feb. 3, 2015.

*Primary Examiner* — Roger Pang
(74) *Attorney, Agent, or Firm* — Studebaker & Brackett PC (57) ABSTRACT

An automatic transmission (1) includes, in a transmission case (2), an input shaft (3), first to third planetary gear sets (PL1-PL3) of a single pinion type, a fourth planetary gear set (PL4) of a double pinion type, five frictional engagement elements (CL1, CL2, and B1-B3), and outputs (7, 8). The outputs (7, 8) are always engaged with a fourth ring gear (R4).

2 Claims, 3 Drawing Sheets

(56) References Cited

U.S. PATENT DOCUMENTS

2011/0105268 A1     5/2011   Phillips et al.
2012/0083381 A1*   4/2012   Wittkopp ................ F16H 3/663
                                                                         475/275

FOREIGN PATENT DOCUMENTS

JP         2008-298126 A     12/2008
JP         2009-174626 A      8/2009

* cited by examiner

|  | CL1 | CL2 | B1 | B2 | B3 | GEAR RATIO | GEAR STEP |
|---|---|---|---|---|---|---|---|
| REVERSE GEAR | ○ |  |  | ○ |  |  |  |
| FIRST GEAR | ○ |  | ○ |  |  | 4.000 | ⎫ 1.531 |
| SECOND GEAR |  |  | ○ | ○ |  | 2.613 | ⎫ 1.500 |
| THIRD GEAR |  | ○ | ○ |  |  | 1.742 | ⎫ 1.286 |
| FOURTH GEAR |  | ○ |  | ○ |  | 1.354 | ⎫ 1.354 |
| FIFTH GEAR | ○ | ○ |  |  |  | 1.000 | ⎫ 1.267 |
| SIXTH GEAR |  | ○ |  |  | ○ | 0.789 | ⎫ 1.161 |
| SEVENTH GEAR | ○ |  |  |  | ○ | 0.680 | ⎫ 1.281 |
| EIGHTH GEAR |  |  |  | ○ | ○ | 0.531 |  |

AUTOMATIC TRANSMISSION

TECHNICAL FIELD

The present invention relates to an automatic transmission including four planetary gear sets and five frictional engagement elements.

BACKGROUND ART

In general, an automatic transmission mounted in a vehicle includes a plurality of planetary gear sets (planetary gear mechanisms), and a plurality of frictional engagement elements (particularly hydraulic frictional engagement elements) such as clutches and brakes. These frictional engagement elements are selectively engaged by hydraulic control, for example, to change power transmission paths through the planetary gear sets, thereby providing a plurality of forward gears and reverse gears (usually one reverse gear).

For example, PATENT DOCUMENT 1 discloses an automatic transmission, which includes three planetary gear sets, and five frictional engagement elements. Two of the frictional engagement elements are engaged to provide one of six forward gears and one reverse gear.

In recent years, there are attempts to increase the number of gears of the automatic transmission to improve the fuel efficiency. One of the methods of increasing the number of gears is to increase the number of planetary gear sets. For example, Patent Document 2 discloses an automatic transmission including four planetary gear sets and five frictional engagement elements to provide eight forward gears and one reverse gear.

CITATION LIST

Patent Document

[PATENT DOCUMENT 1] Japanese Unexamined Patent Publication No. 2008-298126
[Patent Document 2] U.S. Pat. No. 7,824,300

SUMMARY OF THE INVENTION

Technical Problem

As in the Patent Document 2 described above, use of more planetary gear sets in an automatic transmission that provides six forward gears and one reverse gear further increases the number of gears of the automatic transmission and improves the fuel efficiency.

However, more planetary gear sets are needed to increase the number of gears, which leads to an unwanted increase in the overall size of the automatic transmission. In particular, Patent Document 2 teaches driving an output (output shaft) of the automatic transmission with a carrier of a planetary gear set. As compared to the case of driving the output with a ring gear of the planetary gear set, greater force is applied to the respective gears that constitute the planetary gear set to generate the same torque at the output. There is thus a need to increase the number of modules, thicknesses, and widths of the gears that constitute the planetary gear set driving the output. This further increases the overall size of the automatic transmission.

Such a problem could be overcome if the automatic transmission were modified to drive the output by a ring gear of a planetary gear set. Actually, however, it is impossible to modify the automatic transmission only in this respect. Entire change is needed in the engagement relations between the planetary gear sets, clutches, and brakes. That is, an automatic transmission with quite a new configuration needs to be created from the beginning.

In view of the foregoing, it is an object of the present invention to provide an automatic transmission which includes four planetary gear sets and five frictional engagement elements and which reduces an increase in the overall size.

Solution to the Problem

In order to achieve this objective, the present invention provides an automatic transmission. The automatic transmission includes, in a transmission case, an input shaft coupled to a power source; a first planetary gear set of a single pinion type including a first sun gear, a first carrier, and a first ring gear; a second planetary gear set of the single pinion type including a second sun gear, a second carrier, and a second ring gear; a third planetary gear set of the single pinion type including a third sun gear, a third carrier, and a third ring gear; a fourth planetary gear set of a double pinion type including a fourth sun gear, a fourth carrier, and a fourth ring gear; five frictional engagement elements; and an output. The first carrier and the second ring gear are always engaged with the input shaft. The first ring gear is always engaged with the third carrier. The second sun gear is always engaged with the third sun gear. The third carrier is always engaged with the fourth sun gear. The second carrier is always engaged with the fourth carrier. The five frictional engagement elements are comprised of: a first clutch engaging and disengaging the third ring gear with and from the fourth carrier; a second clutch engaging and disengaging the second sun gear with and from the second ring gear, the second carrier with and from the second ring gear, or the second sun gear with and from the second carrier, a first brake engaging and disengaging the first ring gear and the third carrier with and from the transmission case; a second brake engaging and disengaging the third ring gear with and from the transmission case; and a third brake engaging and disengaging the first sun gear with and from the transmission case. The output is always engaged with the fourth ring gear and driven by the fourth ring gear.

In this configuration, the output is driven by the fourth ring gear with a large radius, of the fourth planetary gear set. In particular, since the fourth planetary gear set is of the double pinion type, the fourth ring gear has an even larger radius. This reduces the force applied on the respective gears constituting the fourth planetary gear set to generate the same torque at the output as compared to the case of driving the output with the fourth carrier or the fourth sun gear. As a result, there is no need to increase the number of modules, thicknesses, and widths of the gears of the fourth planetary gear set. This reduces an increase in the sizes of the automatic transmission as measured along its input shaft and its radius, even if a greater number of planetary gear sets are used to increase the number of gears, compared to a conventional automatic transmission that provides six forward gears and one reverse gear.

The automatic transmission may provide eight forward gears and one reverse gear. The first clutch and the second brake may be engaged to provide the reverse gear. The first clutch and the first brake may be engaged to provide a first gear. The first brake and the second brake may be engaged to provide a second gear. The second clutch and the first brake may be engaged to provide a third gear. The second clutch and the second brake may be engaged to provide a fourth gear. The first clutch and the second clutch may be engaged to provide a fifth gear. The second clutch and the third brake may be engaged to provide a sixth gear. The first clutch and the third brake may be engaged to provide a seventh gear. The second brake and the third brake may be engaged to provide an eighth gear.

This provides proper gear reduction ratios in the reverse gear and the first gear to eighth gears by appropriately determining the number of the teeth of the respective gears that constitute the planetary gear sets. In addition, ideal gear steps are provided between the gear stages. That is, the driver of the vehicle including this automatic transmission feels more comfortable to drive the vehicle.

ADVANTAGES OF THE INVENTION

As described above, the automatic transmission according to the present invention drives the output using the fourth ring gear with a larger radius, of the fourth planetary gear set. There is thus no need to increase the number of modules, thicknesses, and widths of the respective gears constituting the fourth planetary gear set. This reduces an increase in the sizes of the automatic transmission as measured along the input shaft and the radius of the automatic transmission, even if a greater number of planetary gear sets are used to increase the number of gears, compared to a conventional automatic transmission that provides six forward gears and one reverse gear. This leads to reduction in an increase in the overall size of the automatic transmission.

DESCRIPTION OF EMBODIMENTS

Embodiments of the present invention will now be described with reference to the drawings.

First Embodiment

Figure 1:
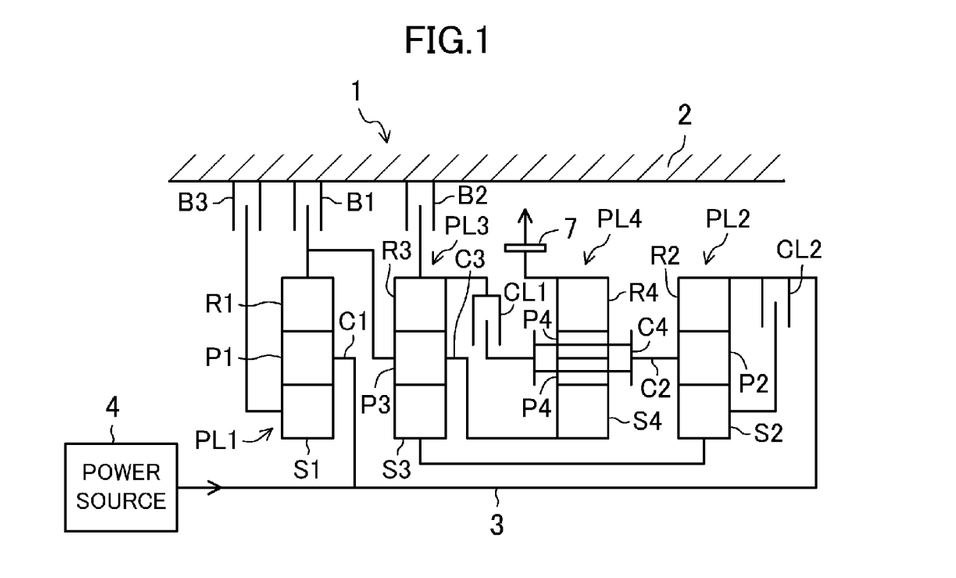
FIG. 1 is a skeleton diagram illustrating an automatic transmission according to a first embodiment of the present invention.

FIG. 1 is a skeleton diagram of an automatic transmission 1 according to a first embodiment of the present invention. This automatic transmission 1 is mounted in a vehicle and provides eight forward gears and one reverse gear.

The automatic transmission 1 includes in a transmission case 2, an input shaft 3, first to fourth planetary gear sets PL1-PL4, an output gear 7, and five frictional engagement elements CL1, CL2, B1, B2, and B3. The input shaft 3 is coupled to a power source 4 (specifically, an output shaft of the power source 4). The output gear 7 is an output to which power from the power source is transmitted via power transmission paths formed by the first to fourth planetary gear sets PL1, PL2, PL3, and PL4. The frictional engagement elements CL1, CL2, B1, B2, and B3 change the power transmission paths.

In this embodiment, the input shaft 3 extends through the entire automatic transmission 1 from one side (the left of FIG. 1) to the other side (the right of FIG. 1). One axial end of the input shaft 3 is coupled to the power source 4. Instead, the other axial end of the input shaft 3 may be coupled to the power source 4. Alternatively, two power sources 4 may be provided, and each power source 4 may be coupled to one end of the input shaft 3.

The power source 4 may be an internal combustion engine or an electric motor. The input shaft 3 may be directly coupled to the power source 4, or indirectly coupled via a torque converter or an engaging/disengaging clutch, for example. If each of two power sources 4 is coupled to one end of the input shaft 3, one of the power sources 4 coupled to one end of the input shaft 3 may be an internal combustion engine, and the other power source 4 coupled to the other side may be an electric motor, for example.

In this embodiment, the vehicle is an FF vehicle. The power source 4 and the automatic transmission 1 are mounted at the front of the vehicle. In this state, the output shaft of the power source 4 and the input shaft 3 of the automatic transmission 1 extend horizontally along the width of the vehicle.

The first planetary gear set PL1 is arranged coaxially with the input shaft 3, and includes a first sun gear S1, a first carrier C1, and a first ring gear RE The first carrier C1 has single pinions P1. That is, the first planetary gear set PL1 is of a single pinion type.

The second planetary gear set PL2 is arranged coaxially with the input shaft 3, and includes a second sun gear S2, a second carrier C2, and a second ring gear R2. The second carrier C2 has single pinions P2. That is, the second planetary gear set PL2 is also of a single pinion type.

The third planetary gear set PL3 is arranged coaxially with the input shaft 3, and includes a third sun gear S3, a third carrier C3, and a third ring gear R3. The third carrier C3 has single pinions P3. That is, the third planetary gear set PL3 is of a single pinion type as well.

The fourth planetary gear set PL4 is arranged coaxially with the input shaft 3, and includes a fourth sun gear S4, a fourth carrier C4, and a fourth ring gear R4. The fourth carrier C4 has double pinions P4. That is, the fourth planetary gear set PL4 is of a double pinion type.

Along the input shaft 3, the first planetary gear set PL1, the third planetary gear set PL3, the fourth planetary gear set PL4, and the second planetary gear set PL2 are arranged in this order from the one end (closer to the power source 4) to the other end of the input shaft 3. The arrangement of the planetary gear sets is not limited thereto.

The first carrier C1 and the second ring gear R2 are always engaged with the input shaft 3. The first ring gear R1 is always engaged with the third carrier C3. The second sun gear S2 is always engaged with the third sun gear S3. The third carrier C3 is always engaged with the fourth sun gear S4. The second carrier C2 is always engaged with the fourth carrier C4.

The five frictional engagement elements are comprised of: a first clutch CL1, a second clutch CL2, a first brake B1, a second brake B2, and a third brake B3 and are arranged coaxially with the input shaft 3. The first and second clutches CL1 and CL2 are multi-plate clutches. The first to third brakes B1-B3 are, in this embodiment, of a multi-plate clutch type but may also be of a band type.

The first clutch CL1 engages and disengages the third ring gear R3 with and from the fourth carrier C4. The second clutch CL2 engages and disengages the second sun gear S2 with and from the second ring gear R2.

The first brake B1 engages and disengages the first ring gear R1 and the third carrier C3 with and from the transmission case 2. The second brake B2 engages and disengages the third ring gear R3 with and from the transmission case 2. The third brake B3 engages and disengages the first sun gear S1 with and from the transmission case 2.

The output gear 7 is arranged coaxially with the input shaft 3, always engaged with the fourth ring gear R4, and driven by the fourth ring gear R4. Although not shown, the output gear 7 meshes with a counter input gear, which is a counter input of a counter mechanism, thereby driving the counter input gear. This counter mechanism includes a counter shaft, the counter input gear, and a counter output gear. The counter shaft extends parallel to the input shaft 3. The counter input gear is arranged on the counter shaft and driven by the output gear 7. The counter output gear is a counter output arranged on the counter shaft. The counter shaft, the counter input gear, and the counter output gear are arranged to rotate integrally. The counter output gear meshes with a differential ring gear, which is a differential input of the differential mechanism, thereby driving the differential ring gear. Then, the torque (power) generated at the output gear 7 is transmitted to the front wheels of the vehicle via the counter mechanism and the differential mechanism.

Now, how to change gears of the automatic transmission 1 will be described.

Figure 2:
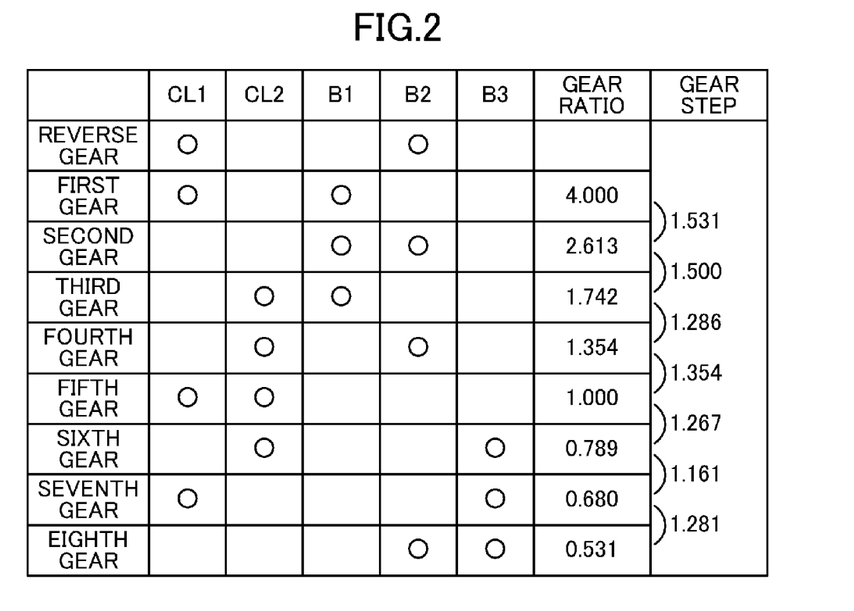
FIG. 2 is a table showing engagement states of first and second clutches and first, second, and third brakes as well as gear ratios and gear steps between the gear stages.

FIG. 2 shows engagement states of the first clutch CL1, the second clutch CL2, and the first to third brakes B1-B3 in respective gear stages. The open circles represent engagements, and the blanks represent disengagements.

FIG. 2 also shows gear ratios (i.e., gear reduction ratios) in the respective gear stages, and gear steps between the gear stages, where the number of teeth of the respective gears constituting the first to fourth planetary gear sets PL1-PL4 are set as below. The gear steps are obtained by dividing the gear ratio in the first gear by the gear ratio in the second gear, the gear ratio in the second gear by the gear ratio in the third gear, the gear ratio in the third gear by the gear ratio in the fourth gear, the gear ratio in the fourth gear by the gear ratio in the fifth gear, the gear ratio in the fifth gear by the gear ratio in the sixth gear, the gear ratio in the sixth gear by the gear ratio in the seventh gear, and the gear ratio in the seventh gear by the gear ratio in the eighth gear. The gear steps between the respective gear stages are also illustrated in a graph of FIG. 3. In FIG. 2, the transmission ratio range, which is obtained by dividing the gear ratio in the first gear by the gear ratio in the eighth gear, is 7.533.

The numbers of teeth of the constituting gears are as follows:

the first sun gear S1: 54, the first ring gear R1: 86, the single pinion P1: 16, the second sun gear S2: 54, the second ring gear R2: 108, the single pinion P2: 27, the third sun gear S3: 54, the third ring gear R3: 86, the single pinion P3: 16, and the fourth sun gear S4: 46, the fourth ring gear R4: 108, and the double pinion P4: 31.

These numbers of the teeth are examples and not limited thereto.

The first clutch CL1 and the second brake B2 are engaged to provide the reverse gear. At this time, the first carrier C1 and the second ring gear R2, which are engaged with the input shaft 3, rotates at a rotational speed N0 in the same direction as the input shaft 3 rotates, where the rotational speed of the input shaft 3 is N0. Unless otherwise stated, the gears are supposed to rotate in the same direction as the input shaft 3. If the gears rotate in the opposite direction to the input shaft 3, statement will be made.

An engagement of the second brake B2 fixes the third ring gear R3 not to allow the third ring gear R3 to rotate. An engagement of the first clutch CL1 does not allow the fourth carrier C4 and the second carrier C2 to rotate, which are engaged with the third ring gear R3.

The first ring gear R1, the third carrier C3, and the fourth sun gear S4 rotate at the same rotational speed N10 in the opposite direction to the input shaft 3. The second sun gear S2 and the third sun gear S3 rotate at the same rotational speed higher than N10 in the opposite direction to the input shaft 3.

Since the first ring gear R1 rotates in the opposite direction to the input shaft 3 at the rotational speed N10, and the first carrier C1 rotates at N0; the first sun gear S1 rotates at a rotational speed higher than N0.

Since the fourth sun gear S4 rotates in the opposite direction to the input shaft 3 at N10, and the fourth carrier C4 does not rotate; the fourth ring gear R4 (i.e., the output gear 7) rotates in the opposite direction to the input shaft 3 at a rotational speed lower than N10.

The first clutch CL1 and the first brake B1 are engaged to provide the first gear. At this time, the first carrier C1 and the second ring gear R2 rotate at the rotational speed N0.

An engagement of the first brake B1 fixes the first ring gear R1, the third carrier C3, and the fourth sun gear S4, not to allow them to rotate.

Since the first carrier C1 rotates at N0 and the first ring gear R1 does not rotate, the first sun gear S1 rotates at a rotational speed higher than N0.

An engagement of the first clutch CL1 allows the second carrier C2, the third ring gear R3, and the fourth carrier C4 at the same rotational speed N11 lower than N0. The second sun gear S2 and the third sun gear S3 rotate at the same rotational speed in the opposite direction to the input shaft 3.

Since the fourth sun gear S4 does not rotate and the fourth carrier C4 rotates at N11, the fourth ring gear R4 (i.e., the output gear 7) rotates at a rotational speed N1 lower than N11.

The first brake B1 and the second brake B2 are engaged to provide the second gear. At this time, the first carrier C1 and the second ring gear R2 rotate at the rotational speed N0.

An engagement of the first brake B1 fixes the first ring gear R1, the third carrier C3, and the fourth sun gear S4 not to allow them to rotate. An engagement of the second brake B2 fixes the third ring gear R3 not to allow the third ring gear R3 to rotate. Since the third carrier C3 and the third ring gear R3 do not rotate, the third sun gear S3 does not rotate, the second sun gear S2 does not rotate, which is engaged with the third sun gear S3.

Since the first carrier C1 rotates at N0, and the first ring gear R1 does not rotate; the first sun gear S1 rotates at a rotational speed higher than N0.

Since the second sun gear S2 does not rotate, and the second ring gear R2 rotates at N0; the second carrier C2 rotates at a rotational speed N12, which is higher than N11 and lower than N0. The fourth carrier C4, which is engaged with the second carrier C2, also rotates at N12.

Since the fourth sun gear S4 does not rotate and the fourth carrier C4 rotates at N12, the fourth ring gear R4 (i.e., the output gear 7) rotates at a rotational speed N2, which is higher than N1 and lower than N12.

The second clutch CL2 and the first brake B1 are engaged to provide the third gear. At this time, the first carrier C1 and the second ring gear R2 rotate at the rotational speed N0.

An engagement of the second clutch CL2 allows the second sun gear S2, the second ring gear R2, and the second carrier C2 to rotate integrally, that is, at the same rotational speed N0. The third sun gear S3, which is engaged with the second sun gear S2, also rotates at N0. The fourth carrier C4, which is engaged with the second carrier C2, also rotates at N0.

An engagement of the first brake B1 fixes the first ring gear R1, the third carrier C3, and the fourth sun gear S4 not to allow them to rotate.

Since the first carrier C1 rotates at N0, and the first ring gear R1 does not rotate; the first sun gear S1 rotates at a rotational speed higher than N0. Since the third sun gear S3 rotates at N0, and the third carrier C3 does not rotate; the third ring gear R3 rotates in the opposite direction to the input shaft 3.

Since the fourth sun gear S4 does not rotate, and the fourth carrier C4 rotates at N0; the fourth ring gear R4 (i.e., the output gear 7) rotates at a rotational speed N3, which is higher than N2 and lower than N0.

The second clutch CL2 and the second brake B2 are engaged to provide the fourth gear. At this time, the first carrier C1 and the second ring gear R2 rotate at the rotational speed N0.

An engagement of the second clutch CL2 allows the second sun gear S2, the second ring gear R2, and the second carrier C2 to rotate at the rotational speed N0. The third sun gear S3, which is engaged with the second sun gear S2, also rotates at N0. The fourth carrier C4, which is engaged with the second carrier C2, also rotates at N0.

An engagement of the second brake B2 fixes the third ring gear R3 not to allow the third ring gear R3 to rotate. Since the third ring gear R3 does not rotate, and the third sun gear S3 rotates at N0; the third carrier C3 rotates at a rotational speed N13 lower than N0. The first ring gear R1 and the fourth sun gear S4, which are engaged with the third carrier C3, rotate at N13.

Since the first carrier C1 rotates at N0, and the first ring gear R1 rotates at N13; the first sun gear S1 rotates at a rotational speed higher than N0.

Since the fourth sun gear S4 rotates at N13, and the fourth carrier C4 rotates at N0; the fourth ring gear R4 (i.e., the output gear 7) rotates at a rotational speed N4, which is higher than N3 and N13 and lower than N0.

The first and second clutches CL1 and CL2 are engaged to provide the fifth gear. At this time, the first carrier C1 and the second ring gear R2 rotate at the rotational speed N0.

An engagement of the second clutch CL2 allows the second sun gear S2, the second ring gear R2, and the second carrier C2 to rotate at the rotational speed N0. The third sun gear S3, which is engaged with the second sun gear S2, also rotates at N0. The fourth carrier C4, which is engaged with the second carrier C2, also rotates at N0. An engagement of the first clutch CL1 allows the third ring gear R3, which is engaged with the fourth carrier C4, to rotate at N0.

Since the third sun gear S3 and the third ring gear R3 rotate at N0, the third carrier C3 also rotates at N0. The fourth sun gear S4, which is engaged with the third carrier C3, also rotates at N0.

Since the fourth carrier C4 and the fourth sun gear S4 rotate at N0, the fourth ring gear R4 (i.e., the output gear 7) rotates at a rotational speed N5, which is higher than N4 and equal to N0.

The second clutch CL2 and the third brake B3 are engaged to provide the sixth gear. At this time, the first carrier C1 and the second ring gear R2 rotate at the rotational speed N0.

An engagement of the second clutch CL2 allows the second sun gear S2, the second ring gear R2, and the second carrier C2 to rotate at the rotational speed N0. The third sun gear S3, which is engaged with the second sun gear S2, also rotates at N0. The fourth carrier C4, which is engaged with the second carrier C2, also rotates at N0.

An engagement of the third brake B3 fixes the first sun gear S1 not to allow the first sun gear S1 to rotate. Since the first carrier C1 rotates at N0, and the first sun gear S1 does not rotate; the first ring gear R1 rotates at a rotational speed N14 higher than N0. The third carrier C3 and the fourth sun gear S4, which are engaged with the first ring gear R1, also rotates at N14.

Since the third carrier C3 rotates at N14, and the third sun gear S3 rotates at N0; the third ring gear R3 rotates at a rotational speed higher than N14.

Since the fourth sun gear S4 rotates at N14, and the fourth carrier C4 rotates at N0; the fourth ring gear R4 (i.e., the output gear 7) rotates at a rotational speed N6, which is higher than N5 and N0 and lower than N14.

The first clutch CL1 and the third brake B3 are engaged to provide the seventh gear. At this time, the first carrier C1 and the second ring gear R2 rotate at the rotational speed N0.

An engagement of the third brake B3 fixes the first sun gear S1 not to allow the first sun gear S1 to rotate. Since the first carrier C1 rotates at N0, and the first sun gear S1 does not rotate; the first ring gear R1 rotates at the rotational speed N14 higher than N0. The third carrier C3 and the fourth sun gear S4, which are engaged with the first ring gear R1, rotate at N14.

An engagement of the first clutch CL1 allows the third ring gear R3, the fourth carrier C4, and the second carrier C2 to rotate at a rotational speed N15 higher than N0 and lower than N14. The second sun gear S2 and the third sun gear S3 rotate at the same rotational speed higher than N14.

Since the fourth sun gear S4 rotates at N14, and the fourth carrier C4 rotates at N15; the fourth ring gear R4 (i.e., the output gear 7) rotates at a rotational speed N7, which is higher than N6 and N15 and lower than N14.

The second brake B2 and the third brake B3 are engaged to provide the eighth gear. At this time, the first carrier C1 and the second ring gear R2 rotate at the rotational speed N0.

An engagement of the third brake B3 fixes the first sun gear S1 not to allow the first sun gear S1 to rotate. Since the first carrier C1 rotates at N0, and the first sun gear S1 does not rotate; the first ring gear R1 rotates at the rotational speed N14 higher than N0. The third carrier C3 and the fourth sun gear S4, which are engaged with the first ring gear R1, also rotates at N14.

An engagement of the second brake B2 fixes the third ring gear R3 not to allow the third ring gear R3 to rotate. Since the third ring gear R3 does not rotate, and the third carrier C3 rotates at N14; the third sun gear S3 rotates at a rotational speed N16 higher than N14. The second sun gear S2, which is engaged with the third sun gear S3, also rotates at N16.

Since the second sun gear S2 rotates at N16, and the second ring gear R2 rotates at N0; the second carrier C2 rotates at a rotational speed N17 higher than N0 and lower than N16. The fourth carrier C4, which is engaged with the second carrier C2, also rotates at N17.

Since the fourth sun gear S4 rotates at N14, and the fourth carrier C4 rotates at N17; the fourth ring gear R4 (i.e., the output gear 7) rotates at a rotational speed N8, which is higher than N7 and N14 and lower than N17.

In this embodiment, the output gear 7 is always engaged with the fourth ring gear R4 of the fourth planetary gear set PL4 and driven by the fourth ring gear R4. Specifically, the output gear 7 is driven by the fourth ring gear R4 of the fourth planetary gear set PL4, which has a large radius. In particular, since the fourth planetary gear set PL4 is of a double pinion type, the fourth ring gear R4 has an even larger radius. This reduces the force applied on the respective gears constituting the fourth planetary gear set PL4 to generate the same torque at the output gear 7 as compared to the case of driving the output gear 7 with the fourth carrier C4 or the fourth sun gear S4. As a result, there is no need to increase the number of modules, thicknesses, and widths of the gears that constitute the fourth planetary gear set PL4. This reduces an increase in the sizes of the automatic transmission 1 as measured along the input shaft and the radius of the automatic transmission, even if a larger number of planetary gear sets are used to increase the number of gears, compared to a conventional automatic transmission, which provides six forward gears and one reverse gear.

Figure 3:
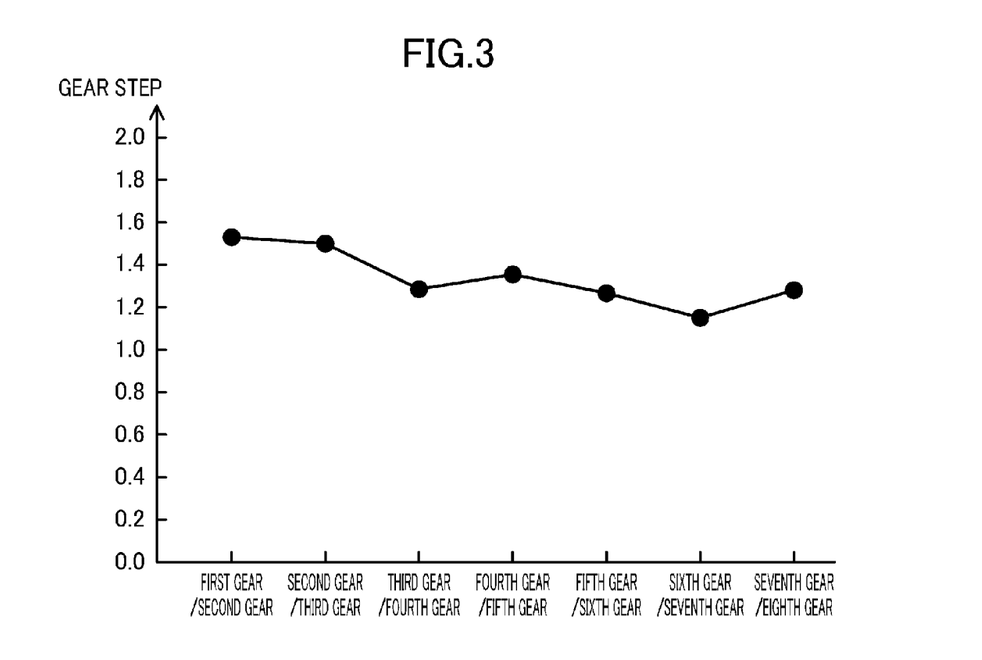
FIG. 3 is a graph illustrating gear steps between the gear stages.

As shown in FIGS. 2 and 3, the gear reduction ratios of the gears are optimized, and ideal gear steps are provided between the gear stages. In general, if the gear step gradually decreases as it goes to the right in the graph of FIG. 3, the driver of the vehicle feels comfortable in driving. However, the gear step is not necessarily in such a shape. The gear steps shown in FIG. 3 sufficiently make the driver comfortable.

Figure 4:
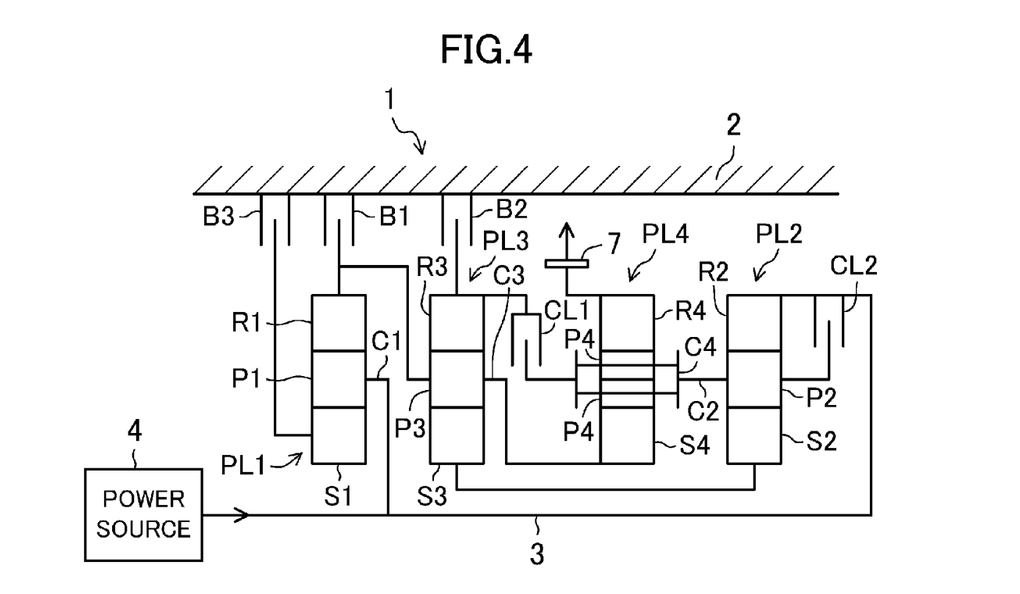
FIG. 4 illustrates a variation of the first embodiment and corresponds to FIG. 1.

FIG. 4 illustrates a variation of the first embodiment. Instead of engaging and disengaging the second sun gear S2 with and from the second ring gear R2, the second clutch CL2 engages and disengages the second carrier C2 with and from the second ring gear R2. The other configurations and arrangements, and the engagements of the first and second clutches CL1 and CL2 and the first to third brakes B1-B3 in the gear stages are the same as in the first embodiment. The same reference characters as those shown in FIG. 1 are used to represent equivalent elements.

Figure 5:
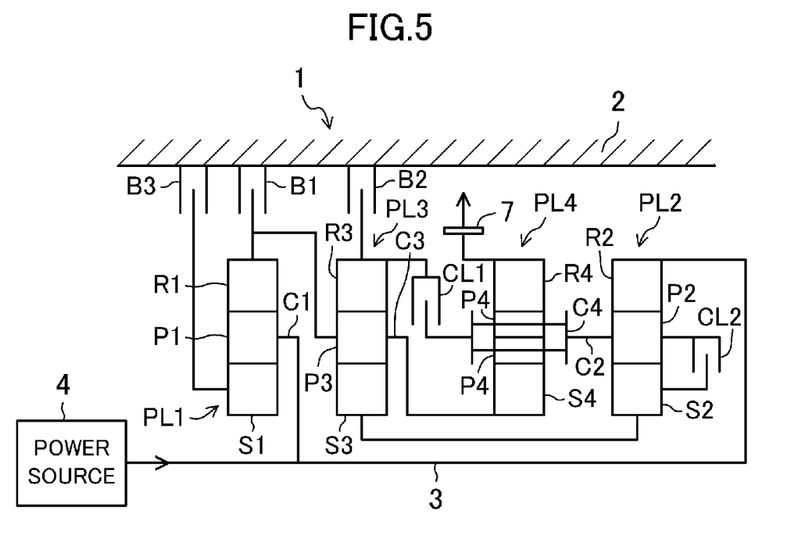
FIG. 5 illustrates another variation of the first embodiment and corresponds to FIG. 1.

FIG. 5 illustrates another variation of the first embodiment. Instead of engaging and disengaging the second sun gear S2 with and from the second ring gear R2, the second clutch CL2 engages and disengages the second sun gear S2 with and from the second carrier C2. The other configurations and arrangements, and the engagements described above are the same as in the first embodiment. The same reference characters as those shown in FIG. 1 are used to represent equivalent elements.

The second clutch CL2 aims to, with its engagement, allow the second sun gear S2, the second carrier C2 and the second ring gear R2 rotate integrally (at the same rotational speed). For this purpose, the second clutch CL2 needs at least to engage and disengage two of the second sun gear S2, second carrier C2, and second ring gear R2 of the second planetary gear set PL2. As a result, the variations provide the same effects and advantages as in the first embodiment.

While, in the first embodiment, the torque (i.e., power) is transmitted from the fourth planetary gear set PL4 to the counter mechanism by the meshing between the output gear 7 and the counter input gear, the torque may be transmitted by chains or belts. In this case, the output driven by the fourth ring gear R4 of the fourth planetary gear set PL4 and the counter input of the counter mechanism are chain sprockets wound with the chains or pulleys wound with the belts. Similarly, the torque (i.e., power) may be transmitted from the counter mechanism to the differential mechanism via chains or belts. In this case, as well, the counter output of the counter mechanism and the differential input of the differential mechanism are chain sprockets wound with the chains or pulleys wound with the belts.

Second Embodiment

Figure 6:
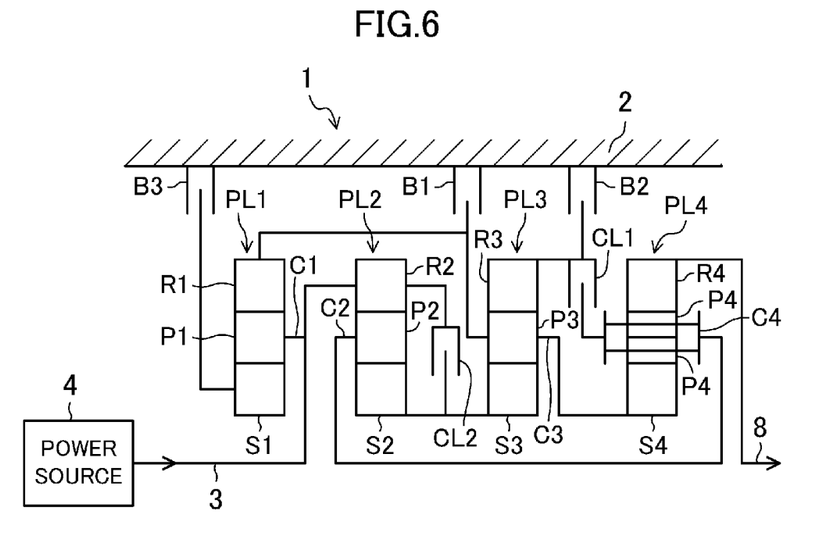
FIG. 6 illustrates a second embodiment of the present invention and corresponds to FIG. 1.

FIG. 6 illustrates a second embodiment of the present invention. The arrangement of the first to fourth planetary gear sets PL1-PL4 is different from that in the first embodiment. The coupling of the four planetary gear sets PL1, PL2, PL3, and PL4, and the engagements of the first and second clutches CL1 and CL2 and the first to third brakes B1-B3 in the respective gear stages are the same as in the first embodiment. The same reference characters as those shown in FIG. 1 are used to represent equivalent elements.

Specifically, in this embodiment, the first to fourth planetary gear sets PL1-PL4 are arranged in this order along the input shaft 3 from one end (i.e., closer to the power source 4) of the input shaft 3.

An automatic transmission 1 according to this embodiment is preferably mounted on an FR vehicle. In this state, an input shaft 3 extends in the vehicle longitudinal direction. A power source 4 is coupled to the input shaft 3 at the front of the vehicle. In this embodiment, the input shaft 3 extends, along the input shaft, from the power source 4 to the position near the first planetary gear set PL1.

In this embodiment, the output gear 7 and the counter mechanism of the first embodiment are not provided. An output shaft 8, which is an output driven by a fourth ring gear R4 of the fourth planetary gear set PL4, is arranged coaxially with the input shaft 3. With the automatic transmission 1 mounted on an FR vehicle, this output shaft 8 extends horizontally from the automatic transmission 1 toward the rear end of the vehicle and is coupled to a propeller shaft (not shown).

This embodiment provides the same effects and advantages as in the first embodiment. In addition, since the fourth planetary gear set PL4 is closest to the rear end of the vehicle among the four planetary gear sets PL1, PL2, PL3, and PL4, the output shaft 8 is located in a most preferable position to be coupled to the propeller shaft.

In the second embodiment, similar to the variations of the first embodiment, instead of engaging and disengaging a second sun gear S2 with and from a second ring gear R2, the second clutch CL2 may engage and disengage a second carrier C2 with and from the second ring gear R2 or engages and disengages the second sun gear S2 with and from the second carrier C2.

The present invention is not limited to the embodiments described above, and may be modified within the scope of the claims.

The embodiments described above are mere examples and are not intended to be construed as limiting the scope of the present invention. The scope of the present invention is defined by the claims. All variations and modifications of the claims and equivalents fall within the scope of the present invention.

INDUSTRIAL APPLICABILITY

The present invention is useful as an automatic transmission that includes, in a transmission case, an input shaft coupled to a power source, four planetary gear sets, five frictional engagement elements, and an output. The present invention is particularly useful as an automatic transmission that provides eight forward gears and one reverse gear.

DESCRIPTION OF REFERENCE CHARACTERS

1 Automatic Transmission
2 Transmission Case
3 Input Shaft
4 Power Source
7 Output Gear (Output)
8 Output Shaft (Output)
P11 First Planetary Gear Set
P12 Second Planetary Gear Set
P13 Third Planetary Gear Set
P14 Fourth Planetary Gear Set
S1 First Sun Gear
S2 Second Sun Gear
S3 Third Sun Gear
S4 Fourth Sun Gear
C1 First Carrier
C2 Second Carrier
C3 Third Carrier
C4 Fourth Carrier
R1 First Ring Gear
R2 Second Ring Gear
R3 Third Ring Gear
R4 Fourth Ring Gear
C11 First Clutch (Frictional Engagement Element)
C12 Second Clutch (Frictional Engagement Element)
B1 First Brake (Frictional Engagement Element)
B2 Second Brake (Frictional Engagement Element)
B3 Third Brake (Frictional Engagement Element)

The invention claimed is:

1. An automatic transmission comprising in a transmission case:
   an input shaft coupled to a power source;
   a first planetary gear set of a single pinion type including a first sun gear, a first carrier, and a first ring gear;
   a second planetary gear set of the single pinion type including a second sun gear, a second carrier, and a second ring gear;
   a third planetary gear set of the single pinion type including a third sun gear, a third carrier, and a third ring gear;
   a fourth planetary gear set of a double pinion type including a fourth sun gear, a fourth carrier, and a fourth ring gear;
   five frictional engagement elements; and
   an output, wherein
   the first carrier and the second ring gear are always engaged with the input shaft,
   the first ring gear is always engaged with the third carrier,
   the second sun gear is always engaged with the third sun gear,
   the third carrier is always engaged with the fourth sun gear,
   the second carrier is always engaged with the fourth carrier,
   the five frictional engagement elements are comprised of:
      a first clutch engaging and disengaging the third ring gear with and from the fourth carrier,
      a second clutch engaging and disengaging the second sun gear with and from the second ring gear, the second carrier with and from the second ring gear, or the second sun gear with and from the second carrier,
      a first brake engaging and disengaging the first ring gear and the third carrier with and from the transmission case,
      a second brake engaging and disengaging the third ring gear with and from the transmission case, and
      a third brake engaging and disengaging the first sun gear with and from the transmission case, and
   the output is always engaged with the fourth ring gear and driven by the fourth ring gear.

2. The automatic transmission of claim 1, wherein
the automatic transmission provides eight forward gears and one reverse gear,
the first clutch and the second brake are engaged to provide the reverse gear,
the first clutch and the first brake are engaged to provide a first gear,
the first brake and the second brake are engaged to provide a second gear,
the second clutch and the first brake are engaged to provide a third gear,
the second clutch and the second brake are engaged to provide a fourth gear,
the first clutch and the second clutch are engaged to provide a fifth gear,
the second clutch and the third brake are engaged to provide a sixth gear,
the first clutch and the third brake are engaged to provide a seventh gear, and
the second brake and the third brake are engaged to provide an eighth gear.

* * * * *

UNITED STATES PATENT AND TRADEMARK OFFICE
CERTIFICATE OF CORRECTION

| | |
|---|---|
| PATENT NO. | : 9,625,012 B2 |
| APPLICATION NO. | : 15/033523 |
| DATED | : April 18, 2017 |
| INVENTOR(S) | : Tatsuhiko Iwasaki et al. |

It is certified that error appears in the above-identified patent and that said Letters Patent is hereby corrected as shown below:

On the Title Page

Item (56) References Cited:
FOREIGN PATENT DOCUMENTS
Change "IE 10 2008 051 177 A1" to --DE 10 2008 051 177 A1--.

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*